UNITED STATES PATENT OFFICE.

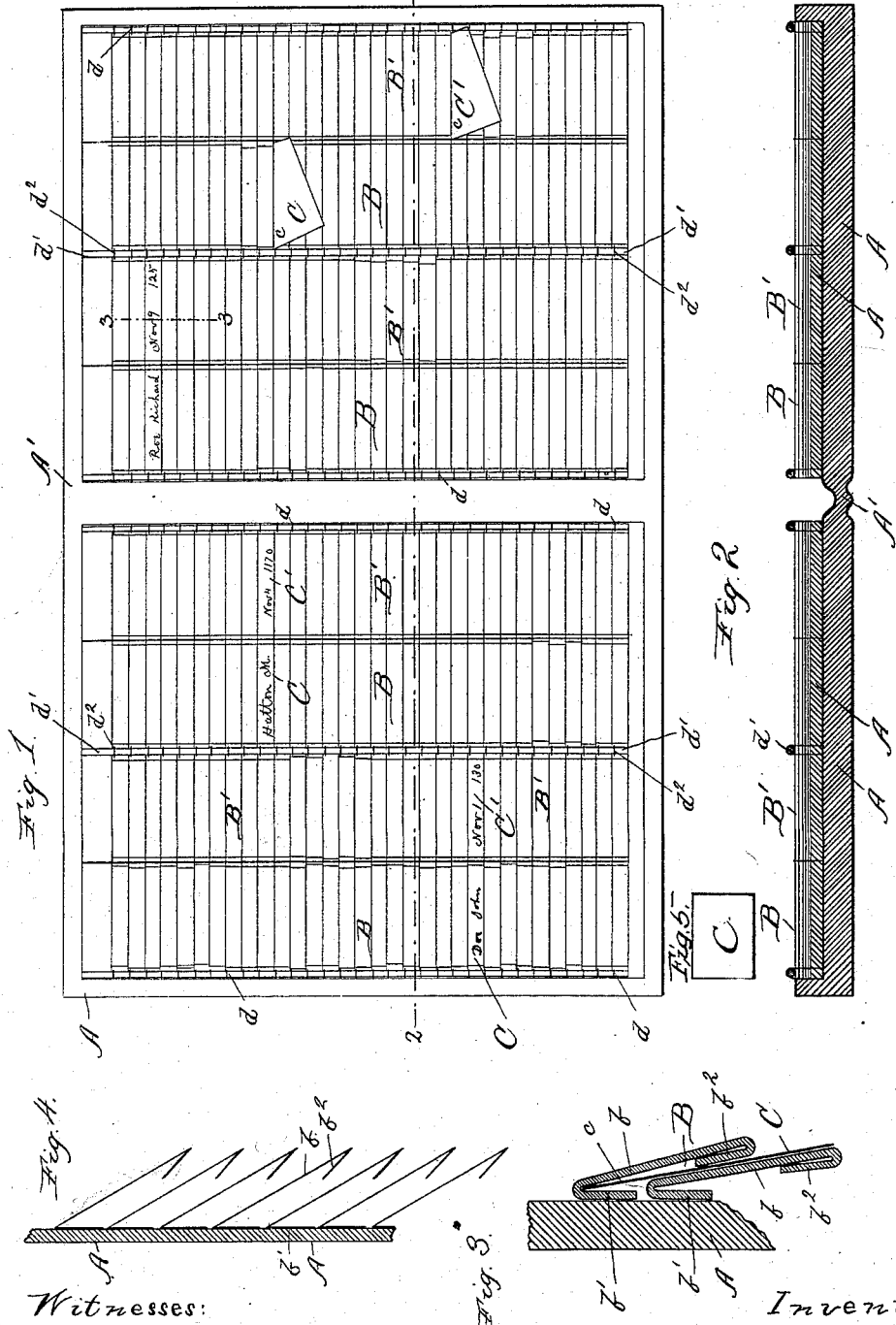

JUNIUS ROGERS, OF FREMONT, NEBRASKA.

ACCOUNT-BOOK.

SPECIFICATION forming part of Letters Patent No. 406,478, dated July 9, 1389.

Application filed December 6, 1888. Serial No. 292,830. (No model.)

*To all whom it may concern:*

Be it known that I, JUNIUS ROGERS, a citizen of the United States, residing in Fremont, in the county of Dodge and State of Nebraska, have invented a new and useful Improvement in Account-Books, of which the following is a specification.

My invention relates to account-books.

Heretofore it has been customary in banks, for example, to make out each day for use of the paying-teller a new balance book or sheet showing the condition of each customer's account at the end of the preceding day. The making of such new balance-book every day involves considerable time and labor, especially as it is necessary that each customers' name shall appear thereon, irrespective of the fact whether any change has been made in his account from the balance-book of the previous day.

It is the object of my invention to provide an account-book for showing the balance of each and every customer from day to day, as heretofore, which will operate to save much of the labor heretofore required in the production of the book.

To this end my invention consists in a balance-book provided with a series of pockets for detachably holding separate slips of paper or leaves, each slip or leaf bearing the account of one customer, so that if there has been a change in such account during the preceding day such slip or leaf may be removed from the pocket and replaced by a new slip or leaf bearing the corrected account, and if there has been no change in the account it may remain undisturbed.

It also consists in providing separate pockets arranged in line with each other, one to contain a slip or leaf bearing the name of the customer and the other a slip or leaf bearing his account, so that the name slip or leaf need not be removed at every change in the account.

My invention also consists in the particular construction of the book and the novel devices and novel combinations of parts and devices herein shown and described, and more particularly pointed out in the claims.

My account-book is designed to facilitate the keeping of accounts where a daily proof-balance is required, and to save the labor of transcribing the accounts, as is sometimes done, or, as is done usually, of carrying forward the whole number of accounts each day on a balance-book for the purpose of making a trial-balance. In my account-book it is necessary to make changes in the columns only as to those accounts which are affected by actual transactions each day, the several accounts showing a standing balance until a change shall occur, in which event the leaf containing the account so changed will be detached and its balance entered upon a new leaf, upon which the items may be placed, the accounting made, and the balance of that particular account brought down, the new leaf then to be inserted on the page displaying the balance in the column of balances against the title of the account. The detached leaves may then be filed away by name or number of the account and held for reference. It is also designed as a bank-teller's paying guide or monitor, which may be under his sight or at his hand, revealing at a glance the condition of the several accounts with which he has to do, and to enable the teller or accountant with facility to compute the account as transactions may occur during banking hours, thus making a continuous proof-balance of the accounts.

In my invention the account-book is constructed of one or more pages, whereon are attached the multiple leaves or slips bearing the account, each leaf containing the items, computation, and wrought-out balance of one account for one day and the same to stand until transactions occur to change the balance of that particular account.

The pages of my account-book, whether one or more, are preferably formed with a paper-board base or other suitable material, upon which, across the face, are laid in parallel lines and regular spaces strips of tough paper so folded and fastened to the base as to form pockets of uniform width and depth, which is done by pressing the strips over flat all in one direction, and then sewing the strips to the base-board at right angles to the lines of the folded strips and at regular spaces. The pockets thus formed are for the reception of the leaves and holding them in place, each leaf or slip being of a size to fill one pocket and to extend below a distance sufficient to display the title of the account and the balance obtaining to the same, the design being to obstruct from view that portion of the page upon which the items are entered and the accounting done and expose upon the page only the title or number of the balance of the account, resulting in an arrangement of the several titles in perpendicular columns, which may be placed in alphabetical order, or otherwise, as may be desired, and the balance of each account in line with its title and the several balances in unobstructed, compact, and perpendicular columns, which may be readily cast up, footed, and proved. The outward edges of the strips forming the pockets are preferably folded under, presenting a doubled edge to re-enforce the lip of the pocket and to add friction to retain the leaves in position. While the pockets are made to receive leaves or strips of uniform size, the leaves above the title and balance lines may be of larger size, they affording more space for the entry of items and for making computations by folding the leaves before insertion. The leaves are prepared with suitable lines and ruling, and may be used each to bear the title and balance, or the title and the balance may be placed upon separate leaves, but the one should be in line with the other on the page. When an account is closed, the leaf containing its title may be withdrawn and its place reoccupied with a new account, thus resulting in the greatest economy of space and material in holding and displaying the title and balances, keeping the whole in compact order. The leaves may be very readily inserted by inserting the corner and then shoving into place by pressure of the end of the finger laid flat upon the leaf.

In the accompanying drawings, which form a part of this specification, and in which similar letters of reference indicate like parts, Figure 1 is a plan view of an account-book embodying my invention. Fig. 2 is a section on line 2 2 of Fig. 1, the thickness of the paper-board forming the base or back of the book being exaggerated and the separate folds of the paper forming the series of pockets on the pages, being represented as distended apart in order to show the same more clearly. Fig. 3 is a partial vertical section on line 3 3 of Fig. 1, the thickness of the parts being here also greatly exaggerated. Fig. 4 is a partial vertical sectional view showing the pocket-forming slips before they are sewed down at their ends. Fig. 5 is a detail plan view of one of the detachable leaves or slips which fit in the pockets on the page of the book and upon which the name or account, one or both, are written.

In said drawings, A represents the back or base of the book, consisting, preferably, of heavy paper-board. The book may preferably have two pages, as indicated in the drawings, the back or base A having a hinge or flexible portion A' between them. The back or base A is preferably made of two thicknesses of board, as is clearly shown in Fig. 2, though it may be formed of a single board, as indicated in Figs. 3 and 4. Each page of the book is furnished with a series of pockets or receptacles B B' for the separately-removable leaves or slips C and C', which bear the name and account of each person. The pockets B B' are each preferably formed by means of pocket-slips $b$, of strong tough paper, having an upper flap $b'$, folded inwardly, and a corresponding flap $b^2$, folded inwardly at its lower edge. The upper flap $b'$ is pasted or otherwise secured to the board A. The lower flap $b^2$ forms a smooth lip or edge for the mouth of the pocket B, and re-enforces or strengthens the same, and also serves to better clamp or hold by friction the paper-leaf C in the pocket B. The inner flaps $b'$ should be in width just equal to the extent that each pocket-slip $b$ projects beyond the next one above it, as the flaps $b'$ will thus serve as a guide in pasting the pocket-slips $b$ parallel to each other and overlapping each other the proper distance. The pocket-slips $b$ are sewed or otherwise secured down flat and snugly upon the board A at each end. The stitching is indicated at $d$. A central cord $d'$, secured by stitching $d^2$, divides the pocket-slips $b$ into two separate pockets B and B', in line with each other, the one for the name or title slip or leaf C, and the other for the account or balance slip C'.

Of course, if desired, the division $d'$ may be omitted and a single pocket B and single leaf C used for both name and account; but the preferable construction is to employ separate pockets and separate leaves for the name and account, as the account or balance leaf requires to be changed much more frequently than the name slip or leaf.

The upper portion $c$ of the account slip or leaf may contain the items of account, the same being concealed from view by the pocket, which permits only the lower line of the leaf containing the name and the balance to appear.

The series of leaves C or C' overlap each other—like clap-boards, for example—and form a vertical column of names and balances, as is clearly indicated in Fig. 1.

I claim—

1. The account-book for showing daily balances, consisting of a base or back board A, provided with a series of pockets B, in a column one above another, furnished with separately-removable name slips or leaves C, and a second series of pockets B', in a column one above another, at the side of said column of pockets B, and furnished with separately-removable account slips or leaves C', substantially as specified.

2. The account-book for showing daily balances, consisting in a base or back board A, furnished with a series of pockets B, formed by a series of pocket-slips $b$, having flaps $b'$ pasted or secured to said board A, one above another, said slips $b$ being sewed or secured at the ends thereof flat upon said board A, and said pockets being furnished with separately-removable account slips or leaves, substantially as specified.

3. The account-book for showing daily balances, consisting in a base or back board A, furnished with a series of pockets B, formed by a series of pocket-slips $b$, having flaps $b'$ secured to said board A, one above another, and flaps $b^2$ folded inwardly at the lower edge of said slips $b$, said slips $b$ being secured at the ends thereof flat upon said board A, and said pockets being furnished with separately-removable account slips or leaves, substantially as specified.

4. The combination of board A with pocket-slips $b$, having flaps $b'$ $b^2$, said flaps $b'$ being secured to said board A, and said pocket-slips $b$ being secured at their ends and also at their middle to said board, so as to form two columns of pockets B and B', and account slips or leaves C and C', fitting in said pockets, substantially as specified.

JUNIUS ROGERS.

Witnesses:
S. J. DUNN,
OTTO SCHURMAN.